Patented June 17, 1947

2,422,453

UNITED STATES PATENT OFFICE 2,422,453

RECOVERY OF GLYCERINE FROM FERMENTED LIQUORS

Robert Alan Walmesley, Howwood, Scotland, assignor to Imperial Chemical Industries Limited, a corporation of Great Britain No Drawing. Application August 8, 1941, Serial No. 406,069. In Great Britain September 18, 1940

10 Claims. (Cl. 260—637)

The present invention relates to the recovery of glycerol formed during the fermentation of carbohydrate material and in particular to the recovery of the glycerol present in the still residues after the alcohol and other volatile products e. g. acetaldehyde have been distilled from the fermented carbohydrate material.

Depending on the nature of the carbohydrate material fermented and the conditions of fermentation, the composition of the still residues may vary, but in all cases they contain a large proportion of non-volatile organic matter in relation to their glycerol content. This may include unfermented and/or unfermentable carbohydrates, phenolic and fatty acid derivatives, and in some cases free organic acids or considerable proportions of inorganic substances may also be present. Certain of these impurities are very difficult to remove from the glycerol and are present in such proportions that no sample of fermentation glycerol, distilled therefrom however pure in other respects, will pass the specification tests applied in most countries to dynamite glycerine intended for use in the manufacture of explosives.

In U. S. patent Re. No. 22,215, there is disclosed a process for the recovery of glycerol from still residues which includes the step of extracting a glycerol containing liquor, while the water content is brought to or kept at a low value, with a liquid solvent for glycerol consisting essentially of a volatile nitrogen base that is substantially immiscible with water. It is preferred to use aniline as the substantial water immiscible nitrogen base.

In the presence of water soluble organic impurities the selectivity of the substantially water immiscible nitrogen base solvent for glycerol in the extraction process, and in particular the proportion of the glycerol in the slop which can be recovered, depends largely on the extent to which the water content of the still residue to be extracted can be reduced; it is desirable to reduce the water content below 30 per cent and preferably below 15 per cent before the extraction is commenced, or at least to achieve such a reduction by boiling off water vapour with the vapour of the base while the extraction is proceeding.

The temperature which it is necessary to maintain in order to prevent a fluid concentrated still residue from becoming stiff and difficult to handle is the higher the lower its water content, and this is especially the case the greater the amount of impurity and inorganic materials associated with the glycerol. The distribution of the glycerol in the solvent layer is increased as the temperature is raised. For these reasons, the process of the foregoing patent Re. 22,215 is most advantageously carried out by conducting the extraction with the substantially water immiscible nitrogen base at a raised temperature rising above the boiling point of water while distilling off water vapour with the vapour of the base.

The temperature gradient of the extractive power of the substantially immiscible nitrogen base for the glycerol in the concentrated still residue is such that the temperature at which the extraction is carried out should considerably exceed the boiling point of water.

In addition to the inconvenience associated with the handling of toxic nitrogen base at temperatures at which its vapour is distilled freely with steam, there is a certain loss of the nitrogen base which must be attributed to thermal decomposition occasioned by the high temperature used and the presence of impurities in the still residues. Some of the glycerol, moreover, may be converted into poly-glycerol at such high temperatures.

According to patent Re. 22,215 a preliminary extraction of the concentrated still residue with a water miscible volatile solvent for glycerol, such as ethyl alcohol, methyl alcohol or pyridine, and the subsequent removal of this water miscible solvent by evaporation before the commencement of the extraction with the substantially water immiscible nitrogen base is advantageous in removing inorganic salts and certain of the organic impurities, but it does not reduce the water content or the proportion of the non-volatile organic matter sufficiently to enable the aforesaid disadvantages in the subsequent extraction with the substantially water immiscible nitrogen base to be avoided.

The present invention provides an improvement or modification of the process described in the aforesaid patent whereby the recovery of glycerol from a carbohydrate fermentation still residue may be considerably simplified and rendered more efficient, and whereby in particular an excellent yield of glycerol of desirable quality may be obtained from a concentrated still residue still containing sufficient water to keep it fluid with a reduced number of extractions while the aforesaid inconveniences may be avoided.

Carbohydrate fermentations are conducted under different conditions depending on whether it is intended to produce a maximum amount of glycerol in relation to the amount of alcohol formed or vice versa. In the first mentioned case the resulting still residues have an alkaline reaction, but in the second case they have an acid reaction.

The present invention is applicable to the recovery of glycerol from the still residues from both kinds of fermentation, but if the still residue is acid, the still residue concentrate must be rendered alkaline or neutral before the extraction process is commenced.

According to the present invention a liquid concentrated carbohydrate fermentation still residue having a non-acid reaction is extracted with a mixture of a substantially water immiscible nitrogen base and a non-acid volatile organic glycerol solvent that is substantially soluble in water at ordinary temperatures and can be distilled from solution in the said base; the extract is separated and the substantially water soluble glycerol solvent and substantially all the water are evaporated from it; the residual nitrogen base phase is separated from the deposit formed during the evaporation and is extracted with water, the resulting aqueous extract phase containing the purified glycerol being separated and concentrated thereafter. It may then be further purified in known manner. The evaporation of the water, and if desired also of the non-acid volatile glycerol solvent from the said extract, may be assisted by the use of reduced pressure. The non-acid volatile organic glycerol solvent substantially soluble in water at ordinary temperature may consist of a water soluble aliphatic alcohol containing up to four carbon atoms, or a water soluble base or the like compound of non-acid character capable of being removed by evaporating it from its solution in the substantially water immiscible nitrogen base, if necessary in the presence of steam. Methyl alcohol, ethyl alcohol, isopropyl alcohol, ethoxy-ethyl alcohol, and pyridine are examples of suitable compounds. It is not essential that the compound used should be miscible with water in all proportions, but it should have a high solvent power for aqueous glycerine, and this characteristic in practice goes hand in hand with a high solubility in water.

In putting the present invention into effect, the still residue is concentrated by evaporation and, if necessary, rendered alkaline or neutral. The extraction with the solvent mixture is carried out at a temperature below that at which the contents of the extraction vessel boil, preferably at atmospheric temperature, and the amount of water left after the preliminary concentration of the still residue may advantageously be sufficient to allow the residue from the said extraction to be run off as a liquid. The extraction may advantageously be repeated or carried out countercurrent in stages or in continuous fashion. As the nitrogen base we prefer to use aniline, and the extracting mixture may for instance consist of a mixture of 30–70 per cent aniline and 70–30 per cent isopropyl alcohol or ethyl alcohol. The resulting extract, which constitutes the upper layer, is separated and introduced into a still in which it is kept boiling at ordinary or reduced pressure at temperatures sufficient only to remove the aqueous distillates, but not the dehydrated nitrogen base, from it. There first distils a mixture of the water soluble solvent and water, and ultimately a mixture of water and the nitrogen base. As the distillate is removed the liquid in the still deposits solid or semi-solid insoluble material. The glycerol solution in the organic base constituting the residual liquid phase is then separated from this deposit, and when cold is extracted in one or more stages or in counter current stages or continuously in counter current with water, and the aqueous extract is concentrated until the glycerine content is not less than about 75 per cent.

The non-aqueous portion of the product may contain up to about 15 per cent non-volatile residue at 160° C. the remainder of the non-aqueous portion being glycerol, and the product may be steam distilled under reduced pressure with little loss yielding a good quality of refined glycerol.

To make a glycerine which will pass the specification tests demanded in most countries for explosive manufacture this refined glycerine can be further purified with an oxidising agent followed by a filtration through activated charcoal.

If the evaporation of the concentrated still residue has been carried too far, the dehydrating effect of the said mixture of water soluble organic solvent and nitrogen base may cause the residue from the first or succeeding extraction therewith to become too thick to handle as a liquid, in which case it may be desirable to introduce a proportion of water into the material at a suitable stage in the process of extraction; for instance by the employment of a proportion of water in said solvent mixture. The aqueous water soluble organic solvent obtained by distillation from previous extracts and the wet nitrogen base recovered by distillation, as well as the wet impure nitrogen base left after the extraction with water, may thus find utilisation instead of being dehydrated, the concentration of the still residues employed being suitably adjusted.

The impure nitrogen base left after the water extractions may be utilised a number of times before it is redistilled, or part of it may be redistilled and part re-utilised each time.

The invention is illustrated by the following examples in which the parts are parts by weight:

*Example 1*

The still residue from a molasses fermentation carried out for the production of alcohol as the principal product is concentrated to yield a liquid containing 12 per cent glycerol, 40 per cent water and 48 per cent impurities and then neutralised with 50% sodium hydroxide. This liquid is then extracted thrice, each time with thrice its own weight of a mixture containing 34 per cent aniline and 66 per cent isopropyl alcohol. The mixture of aniline and isopropyl alcohol used for the third extraction is made up from the impure aniline layers separated from the water washings and from aqueous isopropyl alcohol distillates from a previous batch. The extractions are carried out below 40° C. with agitation. The extracts are separated off and run into a low pressure steam heated still fitted with a thermometer adapted to record the temperature of the distilling vapours and with a condenser and receivers, and are distilled. The first distillates boiling up to about 85° C. consist substantially of a constant boiling mixture of isopropyl alcohol and water, and are sent for recovery or reutilisation. The final distillates that are taken are those boiling at about 98° C. consisting of a mixture of aniline and steam, and the wet aniline is recovered from this distillate. When the whole of the distillate boiling at the last mentioned temperature has been collected the distillation is stopped and the aniline solution remaining in the still is separated from the deposit that has been formed. When the aniline solution is cold it is washed in countercurrent stages with the glycerol containing washings obtained by water washing of previous batches. Washing is continued until nearly all the glycerol has been removed from the aniline solution. The quantity of water required amounts to four times the weight of the glycerol present in the original still residue. The resulting 20–25 per cent glycerol solution is then concentrated to 75 per cent strength. The non-aqueous content of the resulting product is about 85 per cent glycerol and 15 per cent impurity. The recovery is 80 to 90 per cent. By a single steam distillation of the product at reduced pressure refined glycerine is obtained, 93 per cent of the glycerol being recovered. To obtain dynamite quality glycerol this distillate is diluted to 50 per cent strength and treated with an oxidising agent in dilute solution, e. g. a solution freshly made up from sodium peroxide and 100 times its weight of water, the quantity of oxidising agent used per part of distillate being very slightly in excess of that equivalent to the amount of potassium permanganate that is decolorised in acid solution by one part of the distillate. When using the solution made up from sodium peroxide and water mentioned above the excess may with convenience be 0.1 gram per 100 grams of glycerol present. The product is then reconcentrated and redistilled. The resulting distillate is again diluted to 50 per cent strength and filtered hot through activated charcoal and thereafter concentrated by known means.

By steam distilling the residue of the extract obtained with the isopropyl alcohol aniline mixture, a mixture of these materials may be recovered. Aniline may be recovered during the concentration of the 20 per cent aqueous glycerol by collecting a portion of the distillate.

*Example 2*

The same raw material is used as in Example 1, and concentrated to yield a liquid containing

| | Per cent |
|---|---|
| Glycerol | 12 |
| Water | 40 |
| Impurities | 48 | and then neutralised with 50% sodium hydroxide.

This is then extracted 3 times (counter-current) with three times its own weight of a mixture containing 60 per cent aniline and 40 per cent methylated spirits (96 per cent ethyl alcohol) at 40° C. with agitation. The final extract is separated off from the liquid layer beneath it and run into a low pressure steam heated still fitted with a thermometer adapted to record the temperature of the distilling vapours, and with a condenser and receivers, and is distilled. The first distillates boiling up to about 78° C. consist substantially of water and alcohol, and are sent for recovery or re-utilisation. The final distillates that are taken are those boiling at about 98° C. consisting of a mixture of aniline and steam, and the wet aniline is recovered from this distillate. The remainder of the process is carried out as in Example 1, the non-aqueous content of the concentrated glycerol obtained by concentrating the water extracts of the aniline solution separated from the deposit being about 85 per cent glycerol and 15 per cent impurity. This material is refined by a single steam distillation at reduced pressure, yielding about 70 per cent of the glycerol originally present in the still residue as refined glycerin. This refined glycerine can be purified to a dynamite quality by the steps described for this purpose in Example 1. By steam distilling the residue of the extract obtained with the methylated spirits/aniline mixture a portion of these materials may be recovered, and aniline may also be recovered from the concentration of the 20 per cent aqueous glycerol by collecting a portion of the distillate.

As many seemingly widely different embodiments of the invention will be apparent without departing from the spirit and scope thereof it must be understood that the invention is not limited to any specific embodiment except as defined in the appended claims.

I claim:

1. The method of extracting glycerol from a liquid concentrated carbohydrate fermentation still residue having a non-acid reaction which comprises the steps of extracting the residue with a mixture of aniline and a water-miscible organic solvent of the class consisting of pyridine and aliphatic alcohols containing less than 5 carbon atoms in the molecule, separating the extract, evaporating therefrom the water-miscible organic solvent and substantially all the water, separating the aniline phase from any deposit formed during the evaporation and extracting the glycerol from the aniline phase with water.

2. A method as defined in claim 1 wherein the water-miscible organic solvent is ethyl alcohol.

3. A method as defined in claim 1 wherein the water-miscible organic solvent is isopropyl alcohol.

4. A method as defined in claim 1 wherein the water-miscible organic solvent is pyridine.

5. The method of extracting glycerol from a liquid concentrated carbohydrate fermentation still residue having a non-acid reaction which comprises the steps of extracting the residue with a mixture of aniline and a water-miscible organic solvent of the class consisting of pyridine and aliphatic alcohols containing less than 5 carbon atoms in the molecule, at a temperature below the boiling point of the solvent mixture, separating the extract, evaporating therefrom the water-miscible organic solvent and substantially all the water, separating the aniline phase from any deposit formed during the evaporation and extracting the glycerol from the aniline phase with water.

6. The method of extracting glycerol from a liquid concentrated carbohydrate fermentation still residue having a non-acid reaction which comprises the steps of extracting the residue with a mixture of aniline and a water-miscible organic solvent of the class consisting of pyridine and aliphatic alcohols containing less than 5 carbon atoms in the molecule, at substantially atmospheric temperature, separating the extract, evaporating therefrom the water-miscible organic solvent and substantially all the water, separating the aniline phase from any deposit formed during the evaporation and extracting the glycerol from the aniline phase with water.

7. The method of extracting glycerol from a liquid concentrated carbohydrate fermentation still residue having a non-acid reaction which comprises the steps of extracting the residue with a mixture of from 30 to 70 per cent aniline and from 70 to 30 per cent water-miscible organic solvent of the class consisting of pyridine and aliphatic alcohols containing less than 5 carbon atoms in the molecule, separating the extract, evaporating therefrom the water-miscible organic solvent and substantially all the water, separating the aniline phase from any deposit formed during the evaporation and extracting the glycerol from the aniline phase with water.

8. A method as defined in claim 1 wherein the material present during the extraction of the still residue is subjected to the presence of added water.

9. The method of extracting glycerol from a liquid concentrated carbohydrate fermentation still residue having a non-acid reaction which comprises the steps of extracting the residue from a mixture of aniline and a water-miscible organic solvent of the class consisting of pyridine and aliphatic alcohols containing less than 5 carbon atoms in the molecule, separating the extract, evaporating therefrom the water-miscible organic solvent and substantially all the water, separating the aniline phase from any deposit formed during the evaporation, extracting the glycerol from the aniline phase with water and purifying the glycerol by treating it with a solution of one part of sodium peroxide in about 100 parts of water by weight.

10. The method of extracting glycerol from a liquid concentrated carbohydrate fermentation still residue having a non-acid reaction which comprises the steps of extracting the residue from a mixture of aniline and a water-miscible organic solvent of the class consisting of pyridine and aliphatic alcohols containing less than 5 carbon atoms in the molecule, separating the extract, evaporating therefrom the water-miscible organic solvent and substantially all the water, separating the aniline phase from any deposit formed during the evaporation, extracting the glycerol from the aniline phase with water, concentrating and distilling the aqueous glycerol solution, diluting the distillate to a 50 per cent concentration of glycerol, treating the distillate with an aqueous solution of sodium peroxide, concentrating and redistilling the product and again diluting the distillate to a 50 per cent concentration and filtering hot through activated charcoal.

ROBERT A. WALMESLEY.

REFERENCES CITED

The following references are of record in the file of this patent:

UNITED STATES PATENTS

| Number | Name | Date |
| --- | --- | --- |
| 2,153,704 | Werner | Apr. 11, 1939 |
| 2,235,056 | Walmesley | Mar. 18, 1941 |
| 2,235,057 | Walmesley | Mar. 18, 1941 |